United States Patent [19]

Roseboom et al.

[11] Patent Number: 5,882,799
[45] Date of Patent: Mar. 16, 1999

[54] POLYMERIC COUPLING AGENTS FOR THE ADHESION OF MACROMOLECULAR MATERIALS AND METAL SUBSTRATES

[75] Inventors: Frederik Roseboom, Oldenzaal; Cornelis P. J. van der Aar, Hengelo; Adriaan Bantjes, Enschede; Minhua Feng, South Perth, all of Netherlands

[73] Assignee: Vernay Laboratories, Inc., Yellow Springs, Ohio

[21] Appl. No.: 767,458

[22] Filed: Dec. 16, 1996

[51] Int. Cl.⁶ ................................................. B32B 15/08
[52] U.S. Cl. ........................... 428/461; 525/256; 525/259; 525/262; 428/462
[58] Field of Search ............................. 428/461, 462

[56] References Cited

U.S. PATENT DOCUMENTS

| | | | |
|---|---|---|---|
| 2,601,251 | 6/1952 | Bruson | 260/85.5 |
| 2,604,463 | 7/1952 | Bilton et al. | 260/80.5 |
| 2,965,641 | 12/1960 | Krimmel | 260/247.5 |
| 3,000,690 | 9/1961 | Murdoch et al. | 8/128 |
| 3,284,423 | 11/1966 | Knapp | 260/80.5 |
| 3,293,182 | 12/1966 | Bauer et al. | 252/51.5 |
| 3,346,443 | 10/1967 | Elmer | 161/184 |
| 3,967,045 | 6/1976 | Kurobe et al. | 428/463 |
| 3,980,663 | 9/1976 | Gross | 260/29.6 TA |
| 4,081,383 | 3/1978 | Warburton, Jr. et al. | 252/8.6 |
| 4,102,942 | 7/1978 | Smith et al. | 260/836 |
| 4,152,136 | 5/1979 | Taylor | 71/90 |
| 4,159,202 | 6/1979 | Furrer et al. | 96/115 R |
| 4,303,760 | 12/1981 | Nishimura et al. | 525/117 |
| 4,426,243 | 1/1984 | Briggs | 156/307.3 |
| 4,585,780 | 4/1986 | Hider et al. | 514/348 |
| 4,762,866 | 8/1988 | Shih et al. | 523/412 |
| 4,762,892 | 8/1988 | Koch et al. | 525/279 |
| 4,783,510 | 11/1988 | Saotome | 525/329.7 |
| 4,908,371 | 3/1990 | Moerker et al. | 514/318 |
| 4,956,421 | 9/1990 | Denzinger et al. | 525/385 |
| 5,037,888 | 8/1991 | Vanderbilt | 525/108 |
| 5,122,544 | 6/1992 | Bailey et al. | 521/40.5 |
| 5,239,002 | 8/1993 | Ahmed et al. | 525/150 |
| 5,256,676 | 10/1993 | Hider et al. | 514/348 |
| 5,262,486 | 11/1993 | Telser et al. | 252/279 |

OTHER PUBLICATIONS

F.P. Plueddemann, "Silane Coupling Agents", Plenum Press, New York, 1990.
P.M. Lewis in *Handbook of Adhesion*, "Rubber to Metal Bonding", D.E. Packham (ed.), Longman Scientific & Technical, Harlow, 1992. * to be sent when we receive a copy.
W.J. van Ooif, *Rubber Chem. Technol.*, 52, 4.37 (1979). * to be sent when we receive a copy.

*Primary Examiner*—Bernard Lipman
*Attorney, Agent, or Firm*—Biebel & French

[57] ABSTRACT

Polymeric coupling agents incorporate within their structures co-vulcanizable groups such as alkenyl, epoxide, acrylate and/or acrylamide, and metal-complexing groups such as carboxylic, oxime, amine, hydroxamic and/or iminodiacetic groups. The polymeric coupling agents are useful in the adhesion of certain substrates and are particularly useful as adhesives for the adhesion of rubbers with metals. Snytheses of the novel polymeric coupling agents are provided.

17 Claims, No Drawings

POLYMERIC COUPLING AGENTS FOR THE ADHESION OF MACROMOLECULAR MATERIALS AND METAL SUBSTRATES

FIELD OF THE INVENTION

This invention relates generally to novel adhesives, and more specifically relates to polymeric coupling agents acting as adhesives which incorporate within their structures polymer backbones, and, bonded to the backbone as pendant groups, co-vulcanizable groups and chelating groups. The invention also relates to methods of synthesizing and using such polymeric coupling agents as adhesives.

BACKGROUND OF THE INVENTION

The adhesives nowadays used for rubber to metal bonding are either based on silane coupling agents (see is "Silane Coupling agents", F. P. Plueddemann, Plenum Press, New York, 1990) or a mixture of resins, elastomers and fillers which suspended or dissolved in organic solvents (see "Rubber to metal bonding", P. M. Lewis in Handbook of Adhesion, D. E. Packham(ed.), Longman Scientific & Technical, Harlow, 1992). A specific kind of adhesion promoter is a galvanic layer of brass, mainly used in tire cord applications (see W. J. van Ooij, Rubber Chem. Technol., 52, 4.37 (1979)). Most of the adhesives are applied in a two layer system which contains an adhesive layer and a primer layer to obtain durable joints with high chemical resistance, thermal stability and hydrolytical stability. There are still some problems to achieve the required properties in specific rubber to metal adhesion with the adhesives.

Coupling agents are defined as materials that improve adhesion by forming primary bonds to the substrates, applied coatings, or composite materials. The silane coupling agents usually incorporate three hydrolyzable groups and another reactive group on silicon. The hydrolyzable groups are essential when applied to inorganic substrates, whereas the other reactive group is able to react with organic substrates. The main applications of silane coupling agents are in the technology of composites, the paint industry, and in the case of rubber to metal bonding such as the bonding of fluororubbers to metal substrates. It is noted that various organofunctional silanes and a few non-silane coupling agents such as methylacrylate-chrome complex (Volan A) have shown promise as true coupling agents. However, some cases such as the adhesion of EPDM rubber with stainless steel have not been investigated with the silane coupling agents.

Accordingly, it is an object of the present invention to provide novel polymeric coupling agents which will be used as adhesives for the adhesion of some dissimilar substrates such as rubbers with metals.

It is another object of the invention to provide polymeric coupling agents which can be applied in preferred solvents such as water and ethanol.

It is still another object of the invention to provide polymeric coupling agents which incorporate within their structures metal-complexing groups as well as co-vulcanizable groups.

It is a further object of the invention to provide methods of synthesizing the novel polymeric coupling agents.

It is still a further object of the invention to provide methods of using the novel polymeric coupling agents for the adhesion of macromolecular materials with metal substrates, and particularly for the adhesion of rubbers with metals.

SUMMARY OF THE INVENTION

The above and other objects are met by the provision of a coupling agent that is water or alkanol-soluble or dispersible and which provides adhesive efficacy in a wide variety of applications such as rubber with metals. For this reason, water or ethanol-soluble polymers with co-vulcanizable groups are designed. These co-vulcanizable groups can react with the vulcanizable sites of the macromolecular elastomeric materials during vulcanization to form covalent bonds. In addition, the polymeric coupling agents having metal-complexing groups are particularly desirable in contrast to the hydrolyzable groups in silane coupling agents. Through the chelating groups, coordination bonds may be formed between the polymeric coupling agents and the surfaces of metals.

Specific polymer chains are chosen to make the polymers water or ethanol-soluble or dispersible. In this regard, polyacrylic acid, polyacrylamide, and polyvinylamine polymers comply with this requirement and are commercially available in either the polymeric form or in the corresponding monomers. In the case of polyacrylic acid, the COOH functionality thereof provides the desired metal-complexing or chelating function. The

(amido) and the —NH$_2$ (amino) functionality of respectively the polyacrylamide and polyamine polymers similarly provides chelation sites along the polymer backbone.

The availability and reactivity of these unsaturated monomers and their corresponding polymers (i.e., polyacrylic acid, polyacrylamide, and polyamine) make them convenient starting materials onto which co-vulcanizable groups or additional chelate functionality may be provided by reaction of compounds containing such co-vulcanizable or chelate groups with the above polymers.

Other exemplary chelating groups that may be mentioned as useful for bonding to the backbone chain include hydroxamic acid

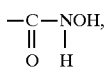

and iminodiacetic acid groups

and others.

Co-vulcanizable groups that may be attached to the polymer backbone include functionalities having an unsaturated bond (i.e. vulcanizable olefinic bond) at a terminal carbon atom. Exemplary members of this group include alkenyl ($C_1$–$C_6$) substituted or unsubstituted alkyl ($C_{1-C_6}$) ethers, N-substituted acrylamido groups and others. These functional groups, upon vulcanization, via heat or other means, provide for the formation of strong, covalent bonds with the olefinic elastomer or rubber bonds.

DETAILED DESCRIPTION OF THE INVENTION

The present invention first of all provides novel polymeric coupling agents which can be used as adhesives for the adhesion of dissimilar substrates and especially for the adhesion of rubbers with metals.

The inventors have demonstrated the effectiveness of novel polymeric coupling agents having chelating groups and co-vulcanizable groups within their structures. The chelating properties of the polymeric coupling agents in combination with their bonding ability make them effective coupling agents in adhesion of some dissimilar substrates. The new polymeric coupling agents display a high affinity for iron as well as other metals, and are thus effective for adhesion of metals.

The water or ethanol-soluble adhesives comprise a polymeric backbone constituent that may, for example, be formed via conventional free radical chain addition polymerization of vinyl monomers, step reaction (condensation) polymerization or ionic and/or coordination chain (addition) polymerization techniques.

Exemplary organic synthetic polymers include polyamines, polyamides, polyacrylamides, polyethers, polyacrylic acid, polyacrylate, polyethylenes, polyesters and polyurethanes.

Generally, the chelating groups attached to the polymeric backbone may, for example, be provided by the groups selected from the class consisting of (a) Carboxylic groups of formula

X=Na, H, or K (b) Oxime groups of formula

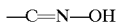

(c) Amine groups of formula

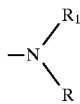

$R_1 = R_2 = H$, $CH_3$ or $CH_2CH_3$ (d) Hydroxamic acid groups of formula

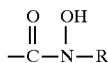

R=H, $CH_3$ or $CH_2CH_3$ (e) Iminodiacetic acid groups of formula

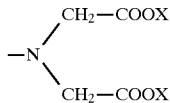

X=H, Na or K; and (f) Mixtures of two or more of the above groups

Generally the co-vulcanizable groups that are attached to the polymer backbone as pendant polymer groups may, for example, be provided by the groups selected from the class consisting of (a) Alkenyl groups of formula

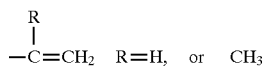

R=H, or $CH_3$ (b) Epoxide groups of formula

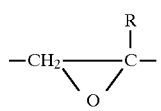

R=H, $CH_3$ or $CH_2CH_3$ (c) Acrylate groups of formula

R=H, or $CH_3$ (d) Amino groups —$NH_2$ (e) Acrylamide groups of formula

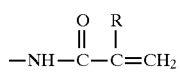

R=H, or $CH_3$; and (f) Mixtures of two or more of the above groups

It is possible to introduce spacers between the chelating or (co)vulcanizable groups with the polymer backbone. Thus a polymeric coupling agents suitable for the process of the present invention may be represented generally by the formula

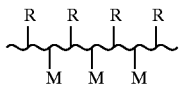

wherein R is a co-vulcanizable group with or without a suitable space. M is a metal-complexing group with or without a suitable spacer. For example, the polymer chain may be polyacrylic acid, M may be a carboxylic group and R may be a group such as

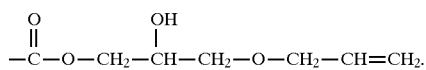

In accordance with the present invention, a process for the preparation of polymeric coupling agents as defined above can be characterized in that chelating groups and co-vulcanizable groups are covalently fixed to the polymer backbone. Any suitable means of covalently fixing chelating groups and co-vulcanizable groups to the polymer backbone can be used provided that the polymeric coupling agents obtained have the necessary adhesive properties.

The chelating groups and co-vulcanizable groups as indicated above can be present in the starting polymers or introduced by modification of existing polymers and/or by the co-polymerization of suitable monomers.

As an example of an introduction of groups at a polymer backbone a polymeric coupling agent comprising carboxylic groups and a co-vulcanizable group can be prepared by copolymerization of acrylic acid with an alkenyl glycidyl ether such as allyl glycidyl ether in the presence of a suitable solvent. The reaction proceeds as follows:

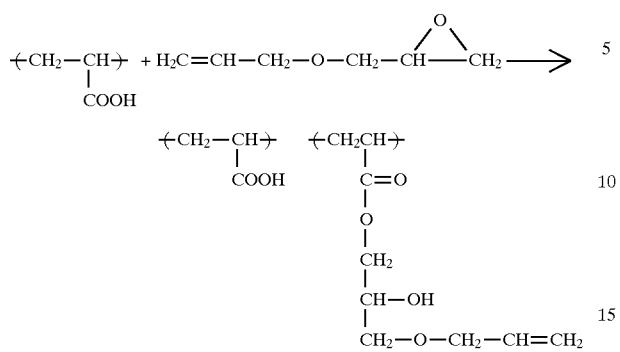

In this modification procedure, the resulting copolymer is an acrylic acid/1-allyloxy 2 hydroxypropylacrylate copolymer. The pendent allyl group provides alkenyl functionality so that cross-linking or bond formation with the desired elastomeric substrate can occur. The COOH group of the acrylic acid repeat unit serves as the chelating group.

The molecular weight of the resulting copolymer is not critical as long as it is water and/or alkanol-soluble and/or dispersible.

Preparation Polyacrylic Acid Derivatives

When a polyacrylic acid backbone polymer is to be used, a commercially available polyacrylic acid can be used as the precursor. The precursor can then be reacted with a compound or compounds providing additional chelation sites or vulcanizable functions in either an aqueous solution or a $H_2O$/EtOH mixture.

For example, a commercially available polyacrylic acid from Aldrich may be reacted with hydroxylamine so as to provide —NHOH hydroxyamino functionality along the polymer backbone. The reaction may proceed as follows:

Synthesis 1—Modification of Poly(acrylic acid) with hydroxylamine (PHA): 5.0 g. poly(acrylic acid) (Aldrich) is dissolved in 40 ml water. 48.5 g Hydroxylamine-HCL (Aldrich) is mixed (500 mol %) with the reaction solution and the pH of the solution is adjusted with aqueous sodiumhydroxide to 3.5. The reaction mixture is then stirred at a temperature of 100° C. for 6 h. The resulting yellow solution is purified by using a dialysis tube ($M_w$=1200 g/mol) for 30 h to separate the low molecular weight material. Water is dried off by freeze drying.

Polyacrylic acid can be similarly modified with allylglycidylether (AGE) to provide vulcanizable pendant functionality on the polymer chain as follows:

Synthesis 2—Modification of Poly(acrylic acid) with allylglycidylether (PAGE): 4–10.0 g of Poly(acrylic acid)(Aldrich) is dissolved in 40 ml water and 40 ml ethanol. 16.6 ml allyglycidylether (Aldrich) is mixed into the solution (100 mol %). The pH is maintained at 4.75. The reaction mixture is then allowed to stir for 5 h at a temperature of 60° C. The ethanol and partly the water is evaporated. The solution is washed with chloroform or toluene, the chloroform or toluene is evaporated and the water is dried off by freeze drying.

If desired both hydroxamic acid groups (containing

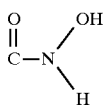

functionality) for chelation and terminal olefinic functionality (from reaction with AGE) to provide vulcanizable sites may be incorporated along the backbone chain. This reaction may proceed in accordance with the following:

Synthesis 3

Synthesis (PHAGE): 10.0 g of the product of synthesis 1 is dissolved in 40 ml water and 40 ml ethanol. 16.6 ml allyglycidylether (Aldrich) is mixed into the reaction solution (100 mol %). The pH is 4.75. The reaction mixture is stirred for 5 h at a temperature of 60° C. The ethanol and partly the water are evaporated. The solution is washed with toluene and dialyzed for 8 h. The water is dried off by freeze drying to obtain a white solid.

Polymer adhesives formed via synthetic routes 1–3 have the following structural formula:

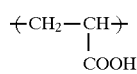

Modified with:

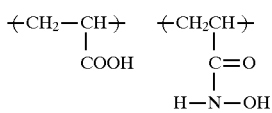

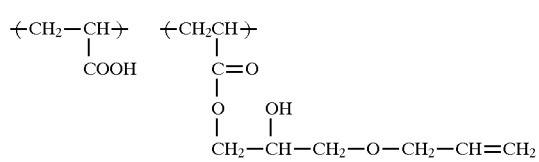

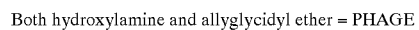

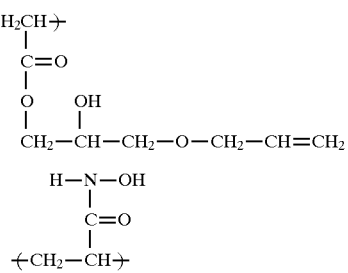

Preparation of Polyacrylamide Derivatives

Polyacrylamide is commercially available and contains —$NH_2$ groups bonded to the acrylamido carbonyl group. These

groups provide a chelation site to chelate metal atoms or ions. Desirably, pendent vulcanizable sites may be added along the polyacrylamide chain by the following reaction.

Synthesis Route 4—Modification of Polyacrylamide with Hydroxylamine (PHAM 20 g Polyacrylamide (Aldrich) is dissolved in 300 ml water. 100 ml 3.3M solution of hydroxylamine ($NH_2OH$—HCl (Aldrich)) is added. The mixture is allowed to stir at room temperature for 30 min. Then the pH of the mixture is adjusted to 12–13 with an aqueous solution of 3.9M NaOH. The reaction is continued for 24 h at room temperature. After this reaction time, the solution is acidified to pH 1 with 3N Hcl and the polymer is isolated by precipitation in methanol.

Synthesis Route 5—Modification of polymer from synthesis route 4 (APHAAM)

20 g. of the polymer product of synthesis route 4 is dissolved in 300 ml water. 12.2 ml allylamine (Aldrich) is added. The mixture is allowed to stir for 30 min. at room temperature. The pH of the solution is adjusted to 12–13 with a 3.9M aqueous solution of sodium hydroxide and the reaction is continued for 24 h at room temperature. After this reaction time the solution is acidified to pH 1 with 3N HCl and the polymer is isolated by precipitation in acetone.

Polymer adhesives formed via synthetic routes 4–5 have the following structural formulae:

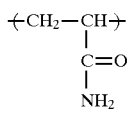

Modified with

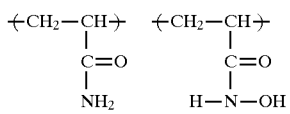

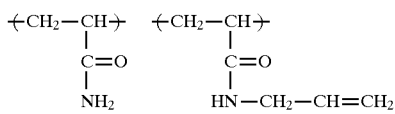

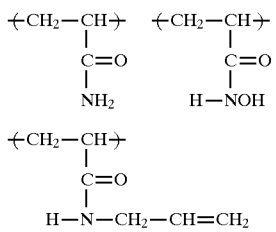

Preparation Polyvinylamine Derivatives

Polyvinylamine polymers are available, for example from Aldrich with Mw of about 50,000. The $NH_2$ functionality pendant from the C—C chain provides excellent chelation cites for chelating metal atoms or ions. These polymers may be modified, for example, by reaction with AGE to provide a terminal double bond for subsequent vulcanization. Also, the polyvinylamine polymers may be reacted with chloroacetic acid or chloroacetic anhydride to result in the addition of iminodiacetic acid functionality to provide chelation sites along the polymer chain.

Synthesis Route 6—Modification of polyamine with chloroacetic acid (PALMINO).

25 g polyvinylamine (Aldrich) is dissvoled in 100 ml water. 8.6 g chloroacetic acid (150 mol %) (Aldrich) is added and the pH is adjusted above 12. The reaction is continued for 24 h at 50° C. After this reaction time, the solution is dialyzed for 8 h with a dialysis tube (Mw=1200 g/mol) to separate the low molecular weight material. Water is dried off by freeze drying.

Synthesis Route 7—Modification of polyamine with allyglycidylether (PALAGE)

5 g polyamine (Aldrich) is dissolved in 30 ml ethanol and 70 ml water. 13.8 ml allyglycidylether (100 mol %) is added. This reaction mixture is stirred for 24 h at 60° C. The ethanol and partly the water is evaporated. The solution is washed with chloroform and the yellow solution is dialyzed for 8 h with a dialysis tube (MW=1200 g/mol) to separate the low molecular weight material. The water is dried off by freeze drying to obtain a yellow solid.

Synthesis Route 8—Modification of Polymer of Synthesis Route 6 with allylglycidylether (PALMINOGE)

2.3 g. of the polymer obtained via synthesis route 6 is dissolved in 30 ml ethanol and 30 ml water. 7 ml allyglycidylether (100 mol %) (Aldrich) is added. The reaction mixture is allowed to stir for 24 h at 60° C. The ethanol and partly the water are evaporated. The solution is washed with toluene and the yellow solution is dialyzed for 8 h with a dialysis tube (MW=1200 g/mol) to separate the low molecular weight material. The water is dried off by freeze drying to obtain a yellow solid.

Polymer adhesives formed via reaction of synthetic routes 6–8 have the following structural formulae:

Allyglycidylether = Palage (XI)

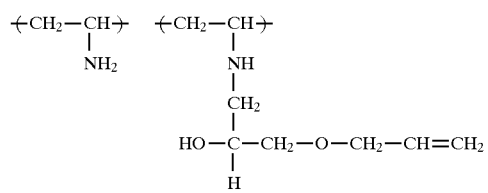

Modified with both chloroacetic acid and (XII)
allyglycidylether = Palminoge

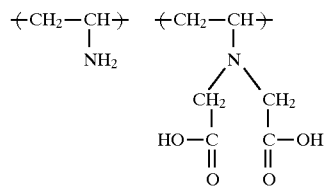

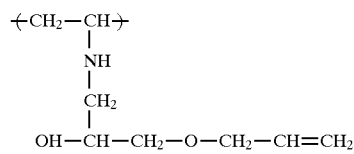

The invention will now be further explained with reference to a number of specific examples which are to be regarded solely as illustrative, and not as restricting the scope of the invention.

EXAMPLES

Example 1

Polymers Prepared

Comparative polymers and polymers in accordance with the invention were prepared and tested for adhesive efficacy.

Poly(acrylic acid)s and the derivatives—Table 1 indicates the polyacrylic acid (comparative) and polyacrylic acid derivatives (copolymers in accordance) with the invention that were prepared in accordance with the procedures described above.

TABLE 1

Comparative Poly(acrylic acid) and
Poly(acrylic acid) Derivatives of the Invention

| Candidate No. | Polymer | MW | % HA | % AGE |
|---|---|---|---|---|
| C-1 | PAA | 2000 | — | — |
| C-2 | PAA | 90,000 | — | — |
| C-3 | PAA | 250,000 | — | — |
| C-4 | PAA | 450,000 | — | — |
| 1 | PHA | 2000 | 10–20 | — |
| 2 | PHA | 90,000 | 10–20 | — |
| 3 | PHA | 250,000 | 10–20 | — |
| 4 | PHA | 450,000 | 10–20 | — |
| 5 | PAGE | 2,000 | — | 10–20 |
| 6 | PAGE | 90,000 | — | 10–20 |
| 7 | PAGE | 250,000 | — | 10–20 |
| 8 | PAGE | 450,000 | — | 10–20 |
| 9 | PHAGE | 2,000 | 10–20 | 10–20 |
| 10 | PHAGE | 90,000 | 10–20 | 10–20 |

TABLE 1-continued

Comparative Poly(acrylic acid) and
Poly(acrylic acid) Derivatives of the Invention

| Candidate No. | Polymer | MW | % HA | % AGE |
|---|---|---|---|---|
| 11 | PHAGE | 250,000 | 10–20 | 10–20 |
| 12 | PHAGE | 450,000 | 10–20 | 10–20 |

C = comparative
PAA = polyacrylic acid
PHA = polyacrylic acid - hydroxylamine reaction product
PAGE = polyacrylic acid - allylglycidylether modified product
PHAGE = polyacrylic acid - hydroxylamine - allyl glycidyl ether reaction product
HA = hydroxylamine
AGE = allylglycidyl ether
MW = MW of precursor polyacrylic acid Polyacrylamide Derivatives—Table 2 indicates the various polyacrylamide derivatives that were prepared in accordance with the procedures referred to above.

TABLE 2

Polyacrylamide Derivatives

| Example No. | Polymer | MW | % HA | % AA |
|---|---|---|---|---|
| C-5 | PAAM | 200,000 | — | — |
| C-6 | PAAM | 5–6 × 106 | — | — |
| 13 | PHAAM | 5–6 × 106 | reacted with A | — |
| 14 | APHAAM | 5–6 × 106 | A | 13 |
| 15 | PHAAM | 200,000 | 5–10 | — |
| 16 | APHAAM | 200,000 | 5–10 | C |

PAAM = polyacrylamide
PHAAM = polyacrylamide/hydroxyl amine reaction product
APHAAM = polyacrylamide/hydroxylamine/allyl amine reaction product
AA = allyl amine
MW' = molecular weight of the polyacrylamide precursor
A = reacted with 120 mol % hydroxylamine * Hcl (Based upon 100 mol % PAAM)
B = reacted with 230 mol % allylamine (Based upon 100 mol % PAAM)
C = reacted with 50 mol % (Based upon 100 mol % PAAM)

Polyamine Derivatives—Table 3 indicates the various polyamine derivatives that were prepared in accordance with the synthetic procedures described above.

TABLE 3

| Example No. | Polymer | MW | CA | AGE |
|---|---|---|---|---|
| C-7 | PALA | 50,000–60,000 | — | — |
| 17 | PALMINO | 50,000–60,000 | A | — |
| 18 | PALAGE | 50,000–60,000 | — | B |
| 19 | PALMINOGE | 50,000–60,000 | A | B |

CA = chloroacetic acid
Pala = polyamine (polyvinylamine)
Palmino = polyamine/chloroacetic acid reaction product
Palage = polyamine/allyl glycidyl ether reaction product
Palminoge = polyamine/allyl glycidyl ether/chloroacetic acid reaction product
MW' = molecular weight of the polyvinylamine precursor
A = reacted with 150 mol % chloroacetic acid (Based upon 100 mol % Pala)
B = reacted with 100 mol % allylglycidylether (Based upon 100 mol % Pala)

Example 2

Adhesion Tests

Procedure

In order to ascertain the efficacy of the polymeric coupling agents in providing adhesion between metal and rubber surfaces, a series of test were performed with test specimens as set forth in ISO procedures 5600 and 814.

In accordance with the ISO 5600 procedure, the test piece is composed of two conical ends of a rigid material (plastic or metal), joined by a cylinder of rubber. The rigid material comprises a pair of metal insert parts: each containing a conical end and an opposed cylindrical end. The diameter of the cylindrical ends is 25 mm, while the half angle of the conical vertex is 45°. The two conical ends of the inserts are spaced apart from each other with the cylindrical rubber material provided, at its opposed longitudinal ends, with "V" shaped concavities; each adapted to mate with a conical end of one of the rigid inserts. The insert-rubber-insert combination is aligned so that a space of about 6 mm separates the tip end of one conical insert from the tip end of the other.

The test adhesives are applied along the interfacial surfaces of each of the "V" shaped concavities of the rubber material and the conical ends of the inserts. The so formed test pieces are vulcanized in a suitable transfer mould for 6 minutes at 185° C. under a clamp pressure of 60 bar. The test pieces were then allowed to relax for 16 h at 21° C. In some cases, (where indicated) the test pieces were then placed in an autoclave in a 50/50 solution of monoethylene glycol and water for 4 or 22 hours at 135° C.

After the preparation, the test pieces are placed in the fixtures of a tensile testing machine. The maximum force used to break the adhesion and/or the rubber fraction was recorded.

Under the testing procedure set forth in ISO-814, a rubber disk and two circular metal plates are provided. The surface of each of the plates is coated with the candidate adhesive material with the rubber cylinder then interposed between the two coated metal plate surfaces. The assembly is then heated under suitable pressure to vulcanize the rubber. After curing, the tensile strength needed to break the adhesion is measured.

All of the metal parts are either cleaned by degreasing with trichloroethylene or with a water based degreasing system. The polymeric coupling agents are typically applied in 1% solution to the metal surface. The parts are then dried for 20 min. at 120° C. and are then ready for molding.

Tested metal alloy surfaces are as follows:

| | |
|---|---|
| Stainless Steel | X12CrMoS17 |
| Mild Steel | 9SMn36 |
| Brass | CuZn39Pb3 |
| Aluminum | AlSilMg |

Example 3

Adhesion Tests

Polyacrylic Acid and Derivatives

Results of ISO 5600 and 814 procedure adhesive tests on acrylic acid and acrylic acid derivatives are shown in Tables 4 and 5. Experimental conditions for these tests were in accordance with the procedures specified above, except where noted to the contrary.

TABLE 4

| | | Adhesion | | | | | | | |
|---|---|---|---|---|---|---|---|---|---|
| Product | | ISO-5600 | | | | ISO-814 | | | |
| Code | Mw | BA[N] | %R | AA[N] | %R | BA[N] | %R | AA[N] | %R |
| Poly (acrylic acid) | | | | | | | | | |
| PAA | 2000 | 106.7 | 0 | 55.1 | 0 | 97.6 | 0 | fdm | |
| PAGE | 2000 | 564.0 | 100 | 300.2 | 0 | 530.5 | 80 | 272.8 | 10 |
| PHA | 2000 | 134.0 | 0 | 182.9 | 0 | 63.1 | 0 | 90.4 | 0 |
| PHAGE | 2000 | 577.3 | 100 | 576.8 | 100 | 434.4 | 0 | 416.2 | 10 |
| PAA | 450000 | 568.0 | 100 | 547.8 | 100 | 622.4 | 50 | 568.2 | 40 |
| PHA | 450000 | 354.1 | 0 | 237.1 | 0 | 436.9 | 10 | 366.7 | 10 |
| PHAGE | 450000 | 381.5 | 0 | 333.9 | 0 | 423.2 | 0 | 395.0 | 0 |

BA[N] = force in Newtons needed to separate the test pieces before the test pieces had been subjected to autoclaving
%R = % a test piece separates due to failure of the EPDM cylinder.
AA[N] = force needed in Newtons to separate the test pieces after the test pieces had been subjected to autoclaving procedure as set forth above. The candidate adhesives were applied to the test surfaces via dip application of 1% aqueous solutions.
fdm-failure during molding
MW = molecular weight of the polyacrylic acid precursor
ruber = EPDM
metal = stainless steel

TABLE 5

| TABLE 5 ISO-5600 | | | | | |
|---|---|---|---|---|---|
| PCA | Can# | BA[N] (1) | %R | AA[N] (1) | %R |
| PAA-2000 | C1 | 80.3 (7.8) | 0 | 77.9 (2.9) | 0 |
| PAA-90000 | C2 | 551.3 (5.4) | 75 | 531.4 (6.2) | 75 |
| PAA-250000 | C3 | 492.7 (33.1) | 5.80 | 508.7 (16.6) | 75 |

TABLE 5-continued

TABLE 5 ISO-5600

| PCA | Can# | BA[N] | (1) | %R | AA[N] | (1) | %R |
|---|---|---|---|---|---|---|---|
| PAA-450000 | C4 | 571.3 | (12.9) | 100 | 522.3 | (27.7) | 100 |
| PHA-2000 | 1 | 27.7 | (17.3) | 0 | fda | | 0 |
| PHA-90000 | 2 | 554.6 | (10.6) | 75 | 529.2 | (6.8) | 75 |
| PHA-250000 | 3 | 556.9 | (0.8) | 70 | 505.4 | (20.6) | 75 |
| PHA-450000 | 4 | 556.3 | (7.0) | 85 | 509.1 | (23.8) | 75–95 |
| PAGE-2000 | 5 | 574.0 | (8.2) | 100 | 559.1) | (4.4) | 100 |
| PAGE-90000 | 6 | 334.4 | (55.6) | 40 | 372.0 | (34.6) | 30–50 |
| PAGE-250000 | 7 | 575.2 | (3.4) | 100 | 553.0 | (4.7) | 80–100 |
| PAGE-450000 | 8 | 482.7 | (67.4) | 35–100 | 311.7 | (90.3) | 40–50 |
| PHAGE-2000 | 9 | 474.4 | (78.3) | 25–55 | 530.3 | (19.5) | 60–95 |
| PHAGE-90000 | 10 | 579.6 | (4.9) | 100 | 564.6 | (7.2) | 100 |
| PHAGE-250000 | 11 | 568-0 | (9.5) | 100 | 562.4 | (5.5) | 100 |
| PHAGE-450000 | 12 | 327.2 | (74.0) | 15–25 | 396.4 | (120.8) | 5–50 | fda = failure during autoclave
Can = candidate
PCA = polymeric coupling agent

Example 4

In order to contrast the efficacy of the candidate adhesives in accordance with the invention to several commercially available silane based adhesives, ISO 5600 tests were undertaken with the results thereof shown in Table 6.

TABLE 6

| Silane | BA[N] | (1) | % R | AA[N] | (1) | % R |
|---|---|---|---|---|---|---|
| Chemosil 511 (10% dip) | 580.2 | (18.0) | 100 | | | |
| Megum 3290 (10% dip) | 258.5 | (57.5) | 10 | | | |
| Megum 3290 (20% dip) | 327.2 | (15.0) | 15 | | | |
| Megum 3290-1 (20% dip) | 344.4 | (88.9) | 5 | 341.4 | | 5 |
| Megum 3290-1 (10% dip) | 575.2 | (6.1) | 100 | | | |
| Megum 3290-1 (10% spray) | 603.9 | (15.7) | 100 | 546.3 | (37.6) | 100 |
| Megum 3270/ Megum 14550 | 575.4 | | 100 | | | |

(% dip) indicates that the % concentration of the adhesive in ethanol (denatured) that was used for dip application of the adhesive onto the requisite test surfaces.
Chemosil 511 = silane mixture; available Henkel
Megum 3290 = silane mixture; available Chemetall
Megum 3290-1 = silane mixture; available Chemetall
Megum 3270/Megum 14550 = unidentified mixtures of reactive polymers and pigments dissolved in MEK and/or xylene; available Chemetall
(1) = standard deviation

Example 5

A series of tests were run utilizing the above ISO-5600 procedure but applying the adhesive to the test surfaces by spraying. In these tests, the coupling agents were sprayed onto preheated (120° C.) metal inserts. Layer thicknesses were controlled by maintaining an approximately constant spraying time per piece sprayed. Results of this test are shown in Table 7.

TABLE 7

Polymeric Coupling Agents Applied By Spraying

| PCA | Can # | BA$^1$[N] | % R | AA[N] | % R |
|---|---|---|---|---|---|
| PAA-2000 | C-1 | 106.7 | 0 | 55.1 | 0 |
| PAGE-2000 | 4 | 564.0 | 100 | 300.2 | 0 |
| PHA-2000 | 1 | 134.0 | 0 | 182.9 | 0 |
| PMAGE-2000 | 9 | 577.3 | 100 | 576.8 | 100 |
| PAA-450000 | C-4 | 568.0 | 100 | 547.8 | 100 |
| PHA-450000 | 4 | 354.1 | 0 | 237.1 | 0 |
| PHAGE-450000 | 12 | 381.5 | 0 | 333.9 | 0 |

BA = Before autoclave
AA = After autoclave (4h, 135° C., 50/50 glycol/water); results in maximum Tensile strength [N] and Rubber Retention [% R]
Rubber - EPDM; Metal = stainless steel alloy

Example 6

Other adhesive efficacy tests were conducted using the ISO 5600 procedures modified as stated. Results are shown in Table 8.

TABLE 8

| PCA | Can# | BA[N] | (1) | %R | AA[N] | (1) | %R |
|---|---|---|---|---|---|---|---|
| PHAGE-250000(.1% dip) | 11 | 383.0 | (19.3) | 50 | 225.8 | (31.9) | 10 |
| PHAGE-250000(.5% dip) | 11 | 545.2 | (5.7) | 90 | 525.9 | (15.4) | 100 |

TABLE 8-continued

TABLE 8

| PCA | Can# | BA[N] (1) | | %R | AA[N] (1) | | %R |
|---|---|---|---|---|---|---|---|
| PHAGE-250000(1% dip) | 11 | 584.5 | (8.2) | 100 | 523.1 | (6.8) | 100 |
| PHAGE-250000(2% dip) | 11 | 585.7 | (6.7) | 100 | 521.4 | (7.6) | 100 |

BA = Before autoclave;
AA = After autoclave (12h, 135° C., 50/50 glycol/water); results in maximum Tensile strength [N] and Rubber Retention [%R]
(1) = standard deviation

Example 7

Commercial adhesives have their own curing systems. When a polymeric coupling agents is applied on the metal surface, it is ready to react with rubber. It does not need any curing time. Thus, it is expected that there is a dependency for the commercial adhesives on temperature and there is no dependency on temperature for the polymeric coupling agents, as long as the rubber is not scorched.

| | PCA-11 PHAGE-250000 | | Commercial adhesive Megum 3200-1 (10%) | | Commercial adhesive Megum 3270/Megum 14550 | |
|---|---|---|---|---|---|---|
| T[°C.] | BA[N] | % R | BA[N] | % R | BA[N] | % R |
| 180 | | 10 | | 10 | 565 | 10 |
| | 543 | 0 | 579 | 0 | | 0 |
| 190 | | 10 | | | | 10 |
| | 556 | 0 | — | — 582 | | 0 |
| 200 | | 10 | | | 478 | |
| | 566 | 0 | 544 | 70 | | 50 |
| 210 | | 10 | | | 45 | |
| | 579 | 0 | 424 | 0 | | 0 |

T = Vulcanization temperature [°C.]
BA = Maximum Lensile Strength before autoclave [N]
Rubber-EPDM; Metal-Stainless steel
— = not executed

Example 8

The previous examples all showed adhesion between EPDM-rubber and Stainless Steel. In this example, the adhesion between EPDM-rubber and other metals were tested with the polymeric coupling agents.

Example 9

Adhesive efficacy tests were performed with some of the polyacrylamide and polyamine based polymeric coupling agents. Results are shown in Table 9. Rubber here is EPDM and the metal surfaces are stainless steel.

| | C4 PAA-450000 | | C1 PAA-2000 (1.0%) | | PCA-11 PHAGE-250000 (1.0%) | | PCA 7 PAGE-250000 (1.0%) | |
|---|---|---|---|---|---|---|---|---|
| | [N] | % R | [N] | % R | [N] | % R | [N] | % R |
| [BA] Metal-Type | | | | | | | | |
| Mild Steel | 526.4 | 100 | 57.6 | 0 | 542.2 | 100 | 534.8 | 100 |
| Aluminium | 514.6 | 100 | 21 | 0 | 527.8 | 100 | 535.8 | 100 |
| Brass | 288.1 | 20 | 11.6 | 0 | 75.8 | 0 | 201 | 5 |
| (AA) Metal-Type | | | | | | | | |
| Mild Steel | 485.3 | 100 | | | 486.3 | 100 | 489.9 | 100 |
| Aluminium | 480.4 | 100 | | | 474.4 | 100 | 491.3 | 100 |
| Brass | 78.8 | 0 | | | 19.4 | 0 | 39 | 0 |

TABLE 9

| PCA | Can # | BA[N] (1) | | %R | AA[N] (1) | | %R |
|---|---|---|---|---|---|---|---|
| PAAm200000 | C-5 | 286.1 | (0.83) | 40 | 186.0 | (82.3) | 5–20 |
| PAAm5-6E6 | C-6 | 234.1 | (25.9) | 0–15 | 58.1 | | 0 |
| PHAAm200000 | 15 | 290.0 | (74.3) | 5–30 | 216.4 | (67.2) | 0–20 |
| PHAAm5-6E6 | 13 | 126.1 | (35.5) | 0 | 77.5 | (0.8) | 0 |
| APHAAm200000 | 16 | 120.7 | (33.8) | 0 | 34.3 | (22.0) | 0 |
| APHAAM5-6E6 | 14 | fdm | | 0 | fdm | | 0 |
| PALA50-60000 | C-7 | 227.0 | (12.3) | 5.15 | | | |

BA = Before autoclave;
AA = After autoclave (4h, 135° C., 50/50 glycol/water); Results in maximum Tensile strength [N] and Rubber Retention [%R]
(1) = standard deviation
fdm = failure during molding

Example 10

Adhesive efficacy tests were performed with some of the polyamine based polymeric coupling agents for EPDM-rubber to stainless steel.

| PCA | BA[N] | % R | AA[N] | % R |
|---|---|---|---|---|
| Polyamine (1%) - C7 | 408 | 60 | 132.9 | 0 |
| Palmino (1%) - 17 | 285.0 | 0 | 142.6 | 0 |
| Palminoge (0.5%) - 19 | 537.4 | 100 | 476.4 | 100 |
| Palage (0.5) - 18 | 296.7 | 20 | 220.1 | 0 |

Polyamine should be modified with both R and M-groups to obtain good adhesion.

Example 11

Two Polymeric Coupling Agents and Poly(acrylic acid)-$C_4$ adhesion of a variation of elastomers to stainless steel.

| Rubber-Type | C4 PAA-150000 BA[N] | % R | PCA-11 PHAGE-250000 BA[N] | % R | PCA-19 PALMINOGE-50000 BA[N] | % R |
|---|---|---|---|---|---|---|
| HNBR | 79.2 | 0 | 485.7 | 0 | 403.9 | 0 |
| FPM | 102.4 | 0 | 170.5 | 0 | 567.2 | 100 |
| VMO | 117.9 | 0 | 140.1 | 0 | 134.6 | 0 |
| FVMQ | 68.1 | 0 | 59.5 | 0 | 19.4 | 0 |
| Blend Q | 76.1 | 0 | 166 | 0 | 78.7 | 0 |

HNBR = Hydrogenated Nitrile Butadiene Rubber
FPM = Fluorocarbonrubber
VMQ = Vinyl Methyl Silicone Rubber
FVMQ = Fluoro Vinyl Methyl Silicone Rubber
Blend Q = Blend van VMQ and FVMQ

Example 12

Synthesis of polymeric adhesive candidate 21 containing carboxylic and methacrylate groups. —acrylic acid/1-(meth) acryloyloxy 2-hydroxypropylacrylate To a flask were added 14.4 g of the 50% solution of polyacrylic acid in water (M.W. 5000), glycidyl methacrylate (40 mmol) and ethanol (30 ml). The solution was stirred at 60° C. for 4 h. The resulting copolymer was purified via evaporation. The reaction proceeded in accordance with the following:

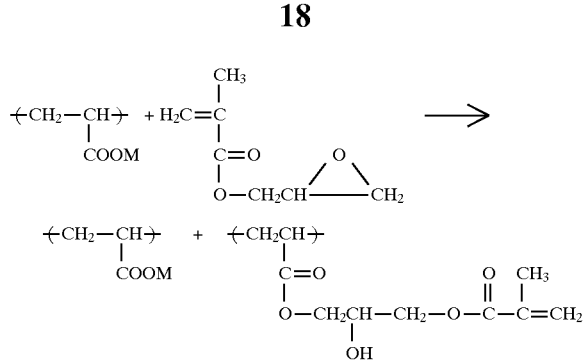

Example 13

Synthesis of polymeric adhesive candidate 22 containing carboxylic and allyl groups—acrylic acid/1-allyloxy 2 hydroxypropylacrylate.

To a flask were added 14.4 g of the 500 solution of polyacrylic acid in water (M.W. 5000), allyl glycidyl ether (40 mmol) and ethanol (30 ml). The solution was stirred at 60° C. for 4 h. The resulting copolymer was purified via evaporation. The reaction proceeded in accordance with the following:

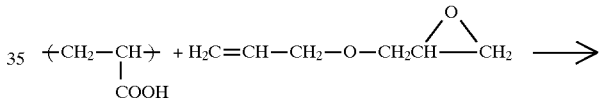

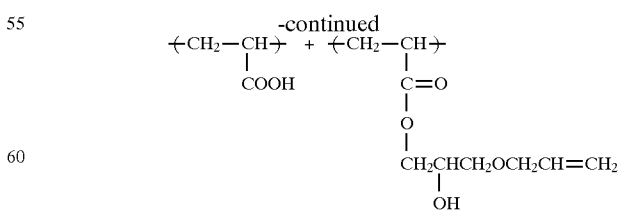

Example 14

Synthesis of polymeric coupling agent 23 containing carboxylic and alkylene groups—acrylic acid/1 decenoxy 2-hydroxypropylacrylate.

To a flask were added undecenoic acid (100 mmol), ethanol (60 ml) and 1,4-butanediol diglycidyl ether (100 mmol). The solution was stirred at 40° C. for 2 h, then 28.8 g of a 50% solution of polyacrylic acid in water (M.W. 5000) was added. The mixture was stirred at 40° C. for 2 h. The resulting copolymer was purified via evaporation.

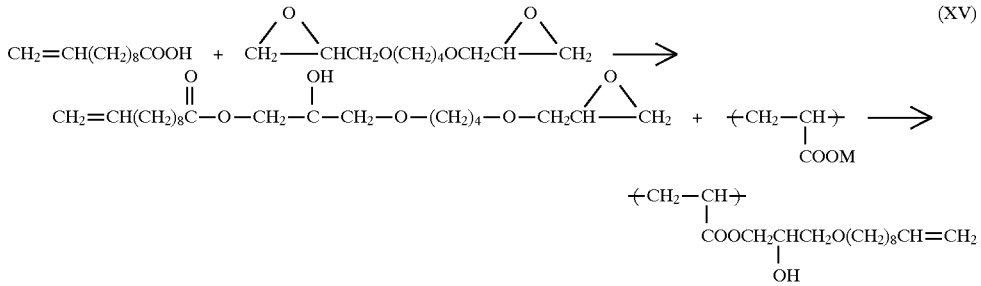

(XV)

Example 15

In order to demonstrate the efficacy of adhesive candidates 21 and 22, additional adhesion tests utilizing the ISO 5600 procedure was undertaken. EPDM rubber was used as the rubber cylinder interposed between mild steel (MS), stainless steel (SS), aluminum and brass conical insert parts. Results are shown in Table 10.

TABLE 10

The adhesion strength between EPDM and various metals with coupling agents (CA) as adhesives.

| Adhesive | | Adhesion strength (Newton) | | | |
|---|---|---|---|---|---|
| Code | Conc. (%)[b] | MS | SS | Al | Brass |
| Blank | 0 | 264 | 494 | 465 | / |
| 21 | 5 | / | 1625 | / | 895 |
| 22 | 5 | 1677 | 1616 | 1716 | 1088 |
| 23 | | | Z | ZZ | |

The maximum value for 100% rubber failure is 1600–1700 Newton,
[b]In ethanol.
Z 853.6N 0% R
ZZ 369.3N 0% R

Example 16

Durability test of the EPDM-metal adhesion.

In these durability tests, the test pieces were put in an autoclave in water for 4 h. at 110° C. under 1 bar overpressure. The adhesion strength was measured according to the method described in Example 2 and the results are shown in Table 11.

TABLE 11

Durability testing results of EPDM-metal adhesion.

| Adhesive | Adhesion strength (Newton)[a] | | |
|---|---|---|---|
| Candidate | MS | SS | Al |
| 21 | 1581 | 1468 | 1232 |
| 22 | 1589 | 1642 | 1446 |

[a]The maximum value for 100% rubber failure is 1600–1700 Newton.

2. Discussion of the Invention

In this invention we developed new polymeric coupling agents to adhere elastomers to metals. Normally, the polymeric coupling agents may be applied in a water and/or ethanol solution in a concentration of about 0.1–20 wt %, preferably 0.5–10 wt %, concentration. The skilled artisan will readily appreciate that molecular weight of the polymer, solubility of the polymer in water and/or ethanol and the final viscosity of polymer solution and the pH of the solution may all be varied depending upon the desired coupling properties of the polymeric coupling agent. The requisite metal may be dip coated or sprayed with the polymeric coupling agent. The substrate is dried for 20 min. at 120° C. after which the rubber can be molded on the substrate by specific molding processes. Characteristic is that the polymeric coupling agent co-vulcanizes with the elastomer during this proces. One of the advantages over the commercial coupling agents is that higher cure temperatures can be used and this results in shorter cure times. Another advantage is that the synthesized polmers are water soluble, so environmentally unfriendly solvents are not necessary.

The adhesive polymers as referred to above can be prepared by grafting of a specific polymer with requisite chelating and vulcanizable groups. It should be also possible to prepare the polymeric coupling agents by polymerization of monomers having the requisite chelating and vulcanizable group thereon.

By the terms chelating or chelation, we mean to include functionality that is capable of complexing, sequestering or bonding via coordinte bonds or otherwise with metal atoms or ions including Al, Cu, Fe, etc. On the other hand, vulcanizable groups, as used herein, include those that bond with elastomer or rubber molecules whether through the formation of chemical crosslinks or otherwise.

Based upon presently available data it is preferred to utilize either poly(acrylic acid) or polyamine as the backbone, chainforming polymer constituent of the invention. The polyacrylamide polymers were not as successful. In the case of the poly(acrylic acid) the carboxylic acid group provides the chelation functionality, in the case of polyamine the amine group provides chelation function and is also known to contribute to vulcanization of fluorocarbonrubbers (FPM). Additional, auxiliary chelation functionality can be provided by further reacting these polymers with, for example, hydroxylamine or chloroacetic acid. In case of the polyamine this is necessary to obtain improved adhesion.

In both the poly(acrylic acid) and the polyamine case, the polmers are preferably reacted with allyglycidylether to provide a co-vulcanizable group on the backbone of the polymer. Poly(acrylic acid) can be used as adhesive itself, but therefore one need a high molecular weight polymer, typically above 450000 g/mol in this case. The elastomer can probably co-vulcanize with the polymer backbone.

Preferred exemplary polymeric coupling agents therefore include:

| Precursor | Chelating Group | Vulcanizable Group | Auxillary Group |
|---|---|---|---|
| poly(acrylic acid) | carboxylic acid group from polymer | allyglycidyl-ether | hydroxylamine for chelation |
| polyamine | amine group from polymer | allyglydicyl-ether | amine group is a vulcanizable group in case of fluororubbers iminodiacetic group for additional chelation |
| polyacrylamide | amide group from polymer | allylamine | allylglycidylether as additional vucanizable moiety |

Preferred chelation groups include the carboxylic acid, the hydroxamic acid and the iminodiacetic acid group. Preferred vulcanizable groups are those comprising 1-alkenyl (terminal alkenyl) functionality such as alkenyl (C1–C6) substituted alkylethers. Most preferably such vulcanizable function is provided by reaction of allylglycidylether to the polymer backbone. These polymers can adhere successfully to a variation of metals and rubbers.

At present, adhesives preferred for use which have shown promising efficacy in effecting metal-rubber bonding are those represented by formula:

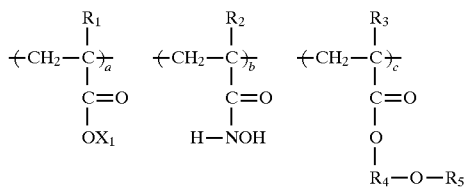

wherein a is present in an amount of 1–99 mol % (based on combined moles of a, b and c present); b, when present, is present in the amount of 1–99 mol % (based on combined moles of a, b and c present); c, when present, is present in the amount of 1–99 mol % (based on combined moles of a, b and c Present), with the provision that either b or c is present. $R_1$, $R_2$ and $R_3$ are the same or different and are either $H_1$ or —$CH_3$. $X_1$ is H or a water and/or ethanol soluble cation such as Na; $R_4$ is a $C_1$–$C_4$ alkylgroup, or a hydroxy substituted $C_1$–$C_4$ alkyl group, $R_5$ is $C_1$–$C_4$ alkenyl. The molecular weight of the polymeric adhesives in accordance with the invention may span from about 1.000 to about 8–9 million g/mol. These polymers have shown to be especially effective in bonding EPDM—metal substrates.

Other adhesives preferred for use which have shown promising efficacy in effecting metal-rubber bonding are those represented by formula:

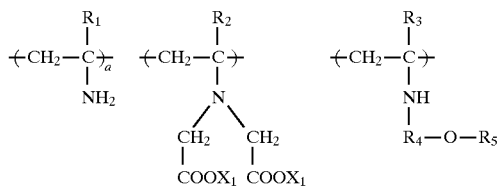

wherein a is present in an amount of 1–99 mol % (based on combined moles of a, b and c present); b, when present, is present in the amount of 1–99 mol % (based on combined moles of a, b and c present); c, when present, is present in the amount of 1–99 mol % (based on combined moles of a, b and c present), with the provision that either b or c is present. $R_1$, $R_2$ and $R_3$ are the same or different and are either H or —$CH_3$. $X_1$ is H or a water and/or ethanol soluble cation such as Na; $R_4$ is a $C_1$–$C_4$ alkylgroup, or a hydroxy substituted $C_1$–$C_4$ alkyl group, $R_5$ is $C_1$–$C_4$ alkenyl. The molecular weight of the polymeric adhesives in accordance with the invention may span from about 1.0100 to about 8–9 million g/mol. These polymers have shown to be especially effective in bonding FPM—metal substrates.

We we have shown and described herein certain embodiments of the invention, it is intended that these be covered as well any change of modification therein which may be made without departing from the spirit and scope of the invention as defined in the appended claims.

What is claimed is:

1. Method of adhering a metal substrate to a rubber substrate comprising contacting one of said substrates with an ethanol or water based dispersion or solution of an adhesive polymer, said adhesive polymer being formed by reaction of compounds (a) or (b) or (a) and (b) with (1) a monomer or monomers selected from the group consisting of acrylic acid, acrylamide and vinylamine and polymerizing said monomer or monomers, or (2) a polymer comprising repeat units formed from polymerization of one or more of said monomers, where (a) is a compound comprising 1-alkenyl functionality adapted to form a vulcanizable functional moiety upon said reaction, (b) is a chelant compound adapted to form a chelating moiety upon said reaction; said compound (a) comprising a member selected from the group consisting of i) alkenyl glycidyl ethers ii) alkenyl glycidyl (meth) acrylates and iii) alkenyl amines, said compound (b) comprising a member selected from the group consisting of hydroxylamine, chloroacetic acid and chloroacetic anhydride; and placing said substrates together with said adhesive polymer interposed herebetween to effect said adhering.

2. Method as recited in claim 1 wherein said monomer is acrylic acid.

3. Method as recited in claim 2 wherein said compound (a) is allylglycidylether.

4. Method as recited in claim 2 wherein said compound (a) is allylamine.

5. Method as recited in claim 2 wherein said compound (b) is hydroxylamine.

6. Method as recited in claim 2 wherein (a) is allyglycidylether and (b) is hydroxylamine.

7. Method as recited in claim 6 wherein said rubber substrate comprises EPDM rubber.

8. Method as recited in claim 1 wherein said monomer is acrylamide.

9. Method as recited in claim 8 wherein (b) is hydroxylamine.

10. Method as recited in claim 8 wherein (a) is allylamine.

11. Method as recited in claim 8 wherein (a) is allylamine and (b) is hydroxylamine.

12. Method as recited in claim 1 wherein said monomer is vinylamine.

13. Method as recited in claim 12 wherein (a) is allylamine.

14. Method as recited in claim 12 wherein (b) is chloroacetic acid.

15. Method as recited in claim 12 wherein (a) is allylglycidylether.

16. Method as recited in claim 12 wherein (a) is allyglycidylether and (b) is chloroacetic acid.

17. Method as recited in claim 16 wherein said rubber substrate comprises a fluorocarbon rubber.

* * * * *